Figure 1:
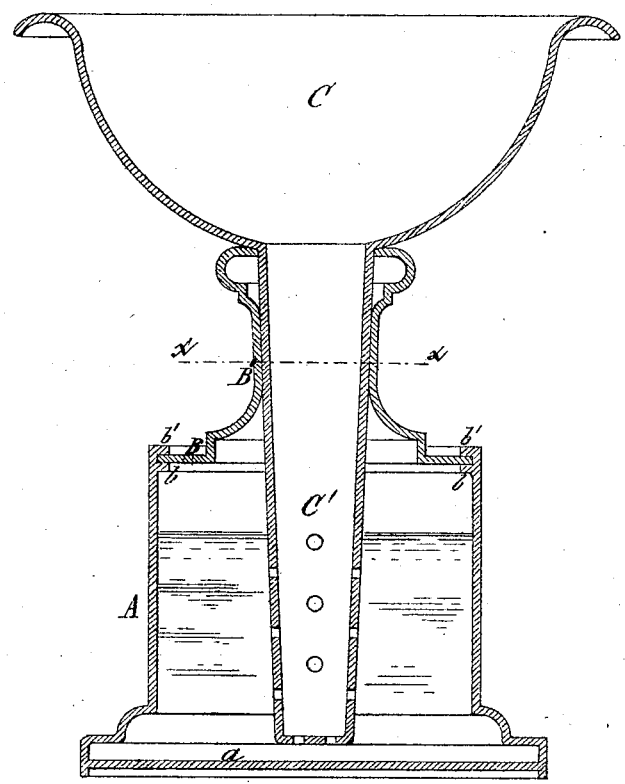
Figure 2:
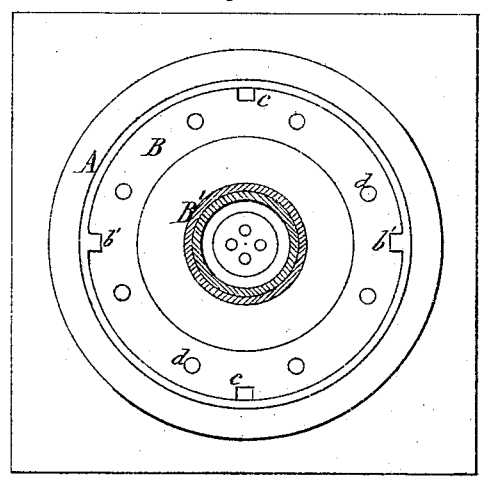

M. B. GOULD.

Flower-Pots.

No. 135,271. Patented Jan. 28, 1873.

UNITED STATES PATENT OFFICE.

MARCUS B. GOULD, OF BUFFALO, NEW YORK, ASSIGNOR TO HIMSELF AND SAMUEL D. OAKS, OF SAME PLACE.

IMPROVEMENT IN FLOWER-POTS.

Specification forming part of Letters Patent No. 135,271, dated January 28, 1873.

*To all whom it may concern:*

Be it known that I, MARCUS B. GOULD, of the city of Buffalo, in the county of Erie and State of New York, have invented a certain Improvement in Flower-Pots, of which the following is a specification:

My improvement relates to that class of flower-pots which are provided with a water-reservoir from which the plants are supplied with moisture. The invention consists in the combination, with a base water-reservoir provided at the top with a cap or cover, carrying in the center an upwardly-projecting hollow bearing or sleeve, of a flower pot or vase provided with a downwardly-extending tube, the upper portion of which fits in the sleeve or bearing of the base-reservoir, whereby the flower-pot is supported at a suitable distance above the latter, while its lower portion is perforated and extends downward into the reservoir within a short distance from the bottom, so that the earth with which said tube is filled absorbs and gradually conducts the water by capillary attraction to the earth in the flower-pot.

In the accompanying drawing, Figure I is a sectional elevation of my improved flower-pot; and Fig. II, a horizontal section on line $x\ x$, Fig. I.

Like letters designate like parts in each of the figures.

A represents the base-piece, of cylindrical or other suitable shape, forming the water-reservoir; $a$, the bottom thereof; and $b$, a flange cast on the inner side of the reservoir A, near its top. B is the cap or cover resting on the flange $b$ of the reservoir, and B' the central and upwardly-projecting hollow bearing or sleeve of the cap B. The latter is secured to the reservoir A by two or more lugs, $b'$, arranged on the inner side of the reservoir A, above the flange $b$, as shown in Fig. I. The cap B is provided in its circumference with notches $c$, corresponding with the lugs $b'$, so that by making the notches $c$ coincide with the lugs $b'$ the cap can be placed on the flange $b$, when, by a partial turn, it is secured in place. C is the flower pot or vase, of any desired shape, resting on the top of the sleeve B' and C', the tubular extension formed with the pot C, and extending downwardly through the sleeve B', which it snugly fits, into the reservoir A. The lower portion of the tube C' is provided with perforations, as clearly shown in Fig. I. The flower-pot C and tube C' being filled with earth, the water contained in the reservoir A is gradually absorbed by the earth in the tube C', and conducted by capillary attraction to the main body of the earth contained in the flower-pot C. As the latter is supported at some distance above the water-reservoir A by the sleeve B', any excessive and injurious supply of moisture to the plants in the flower-pot is prevented when the reservoir is full of water, while a uniform and sufficient supply is insured so long as any water remains in the reservoir. The upper projecting edge of the reservoir A forms, with the cap B resting on the flange $b$, an annular groove, as clearly shown in the drawing. The cap B is provided with several openings, $d$, so that the reservoir can be readily filled by pouring the water into said groove, thereby obviating the necessity of removing the cap B for the purpose. The flower-pot B and pendent tube B' can be readily removed when required, without disturbing the connection of the lower parts.

My improved flower-pot is cheaply constructed, and presents the neat and ornamental appearance of an ordinary vase and base-piece.

What I claim as my invention is—

The combination, with the base water-reservoir A and cap and bearing B B', of the flower-pot C provided with conducting-tube C', which extends downward into the reservoir, substantially as hereinbefore set forth.

MARCUS B. GOULD.

Witnesses:
JOHN J. BONNER,
EDWARD WILHELM.